US009298869B2

(12) United States Patent
Tu

(10) Patent No.: US 9,298,869 B2
(45) Date of Patent: Mar. 29, 2016

(54) METHOD FOR SHOWING HIERARCHICAL STRUCTURE FOR A GIVEN POWER INTENT DESCRIBED IN A POWER INTENT DESCRIPTION LANGUAGE WITH A DESIGN DESCRIBED IN A HARDWARE DESIGN DESCRIPTION LANGUAGE, AND ASSOCIATED APPARATUS AND ASSOCIATED COMPUTER PROGRAM PRODUCT

(71) Applicant: MEDIATEK INC., Hsin-Chu (TW)

(72) Inventor: Shang-Wei Tu, Hsinchu County (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 14/284,411

(22) Filed: May 22, 2014

(65) Prior Publication Data
US 2015/0178417 A1    Jun. 25, 2015

Related U.S. Application Data

(60) Provisional application No. 61/918,758, filed on Dec. 20, 2013.

(51) Int. Cl.
G06F 17/00 (2006.01)
G06F 17/50 (2006.01)

(52) U.S. Cl.
CPC .......... *G06F 17/505* (2013.01); *G06F 2217/78* (2013.01)

(58) Field of Classification Search
CPC ................................. G06F 17/30; G06F 17/50
USPC ......................................................... 716/105
See application file for complete search history.

(56) References Cited

U.S. PATENT DOCUMENTS

| 2005/0108667 A1* | 5/2005 | Iadanza et al. ..................... 716/4 |
| 2006/0064293 A1* | 3/2006 | Kapoor et al. ..................... 703/18 |
| 2006/0184905 A1* | 8/2006 | Floyd et al. ...................... 716/5 |
| 2007/0044044 A1* | 2/2007 | Wilson et al. ..................... 716/1 |
| 2008/0127014 A1* | 5/2008 | Pandey et al. ..................... 716/5 |
| 2011/0320991 A1* | 12/2011 | Hsu et al. ...................... 716/103 |

* cited by examiner

*Primary Examiner* — Mohammed Alam
(74) *Attorney, Agent, or Firm* — Winston Hsu; Scott Margo

(57) ABSTRACT

A method for showing hierarchical structure for a given power intent described in a power intent description language (e.g. a formal power intent description language) with a design described in a hardware design description language, an associated apparatus, and an associated computer program product are provided, where the method includes: retrieving hardware design description contents written in the hardware design description language from a hardware design description file, and retrieving power intent description contents written in the power intent description language from a power intent description file; and controlling a display module to display a power domain hierarchy associated with the power intent description contents and the hardware design description contents respectively retrieved from the power intent description file and the hardware design description file, wherein the power domain hierarchy includes at least one power domain. For example, the power intent description language is the unified power format (UPF) language.

19 Claims, 11 Drawing Sheets

METHOD FOR SHOWING HIERARCHICAL STRUCTURE FOR A GIVEN POWER INTENT DESCRIBED IN A POWER INTENT DESCRIPTION LANGUAGE WITH A DESIGN DESCRIBED IN A HARDWARE DESIGN DESCRIPTION LANGUAGE, AND ASSOCIATED APPARATUS AND ASSOCIATED COMPUTER PROGRAM PRODUCT

CROSS REFERENCE TO RELATED APPLICATIONS

This application claims the benefit of U.S. Provisional Application No. 61/918,758, which was filed on Dec. 20, 2013, and is included herein by reference.

BACKGROUND

The present invention relates to power design tools, and more particularly, to a method for showing hierarchical structure for a given power intent described in a power intent description language (e.g. a formal power intent description language) with a design described in a hardware design description language, and an associated apparatus and an associated computer program product.

Conventional power design/debugging tools may be widely used by low power designers for various kinds of electronic products. According to the related art, the aforementioned conventional power design/debugging tools typically show the power design in a flat manner, and therefore, some problems may occur. For example, the user of one of the aforementioned conventional power design/debugging tools, such as a designer, cannot easily debug his/her power design since the raw information of the power design given by conventional tools is not user-friendly. As a result, conventional power design/debugging tools may result in inefficiency when designers use these tools to design or debug. Thus, a novel method is required for improving power design/debugging tools and enhancing the user experience and the design/verification environment.

SUMMARY

It is an objective of the claimed invention to provide a method for showing hierarchical structure for a given power intent described in a power intent description language (e.g. a formal power intent description language) with a design described in a hardware design description language, and an associated apparatus and an associated computer program product, in order to solve the above-mentioned problems.

It is another objective of the claimed invention to provide a method for showing hierarchical structure for a given power intent described in a power intent description language (e.g. a formal power intent description language) with a design described in a hardware design description language, and an associated apparatus and an associated computer program product, in order to improve power design/debugging tools and enhance the user experience and the design/verification environment.

According to at least one preferred embodiment, a method for showing hierarchical structure for a given power intent described in a power intent description language (more particularly, a formal power intent description language) with a design described in a hardware design description language is provided, where the method comprises the steps of: retrieving hardware design description contents written in the hardware design description language from a hardware design description file, and retrieving power intent description contents written in the power intent description language from a power intent description file; and controlling a display module to display a power domain hierarchy associated with the power intent description contents and the hardware design description contents respectively retrieved from the power intent description file and the hardware design description file, wherein the power domain hierarchy comprises at least one power domain. More particularly, the method may further comprise: creating a data structure of the power domain hierarchy according to the power intent description contents and the hardware design description contents respectively retrieved from the power intent description file and the hardware design description file; and creating the power domain hierarchy for coverage annotation, debugging, or design review according to the data structure of the power domain hierarchy (more particularly, according to the data structure of the power domain hierarchy and the hardware design hierarchy). For example, the power intent description language can be the unified power format (UPF) language (or the so-called IEEE standard 1801). In addition, the hardware design description language can be VHDL (Very-High-Speed Integrated Circuits (VHSIC) Hardware Description Language, or IEEE standard 1076), SystemVerilog (IEEE standard 1800), or Verilog (IEEE standard 1364).

According to at least one preferred embodiment, an apparatus for showing hierarchical structure for a given power intent described in a power intent description language (more particularly, a formal power intent description language) with a design described in a hardware design description language is provided, where the apparatus comprises at least one portion of the electronic device. The apparatus comprises a storage module arranged to store information for the electronic device, and further comprises a processing circuit arrange to control operations of the electronic device according to program instructions loaded from the storage module, where the processing circuit is coupled to the storage module. In addition, the processing circuit retrieves hardware design description contents written in the hardware design description language from a hardware design description file, retrieves power intent description contents written in the power intent description language from a power intent description file, and controls a display module to display a power domain hierarchy associated with the power intent description contents and the hardware design description contents and the hardware design description contents respectively retrieved from the power intent description file and the hardware design description file, wherein the power domain hierarchy comprises at least one power domain, and the display module is positioned within or outside the electronic device. More particularly, the method may further comprise: creating a data structure of the power domain hierarchy according to the power intent description contents and the hardware design description contents respectively retrieved from the power intent description file and the hardware design description file; and creating the power domain hierarchy for coverage annotation, debugging, or design review according to the data structure of the power domain hierarchy (more particularly, according to the data structure of the power domain hierarchy and the hardware design hierarchy). For example, the power intent description language can be the unified power format (UPF) language (or the so-called IEEE standard 1801). In addition, the hardware design description language can be VHDL (IEEE standard 1076), SystemVerilog (IEEE standard 1800), or Verilog (IEEE standard 1364).

According to at least one preferred embodiment, a computer program product is provided, where the computer program product has program instructions for instructing a processor of an electronic device to perform a method comprising the steps of: retrieving hardware design description contents written in a hardware design description language from a hardware design description file, and retrieving power intent description contents written in a power intent description language from a power intent description file; and controlling a display module to display a power domain hierarchy associated with the power intent description contents and the hardware design description contents and the hardware design description contents respectively retrieved from the power intent description file and the hardware design description file, wherein the power domain hierarchy comprises at least one power domain, and the display module is positioned within or outside the electronic device. More particularly, the method may further comprise: creating a data structure of the power domain hierarchy according to the power intent description contents and the hardware design description contents respectively retrieved from the power intent description file and the hardware design description file; and creating the power domain hierarchy for coverage annotation, debugging, or design review according to the data structure of the power domain hierarchy (more particularly, according to the data structure of the power domain hierarchy and the hardware design hierarchy). For example, the power intent description language can be the unified power format (UPF) language (or the so-called IEEE standard 1801). In addition, the hardware design description language can be VHDL (IEEE standard 1076), SystemVerilog (IEEE standard 1800), or Verilog (IEEE standard 1364).

It is an advantage of the present invention that the present invention method, the associated apparatus, and the associated computer program product can provide excellent user experience for end-users and can be very helpful on power designs, and therefore enhance the design and verification environment. In addition, the present invention method, the associated apparatus, and the associated computer program product can facilitate the development of various kinds of electronic products.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
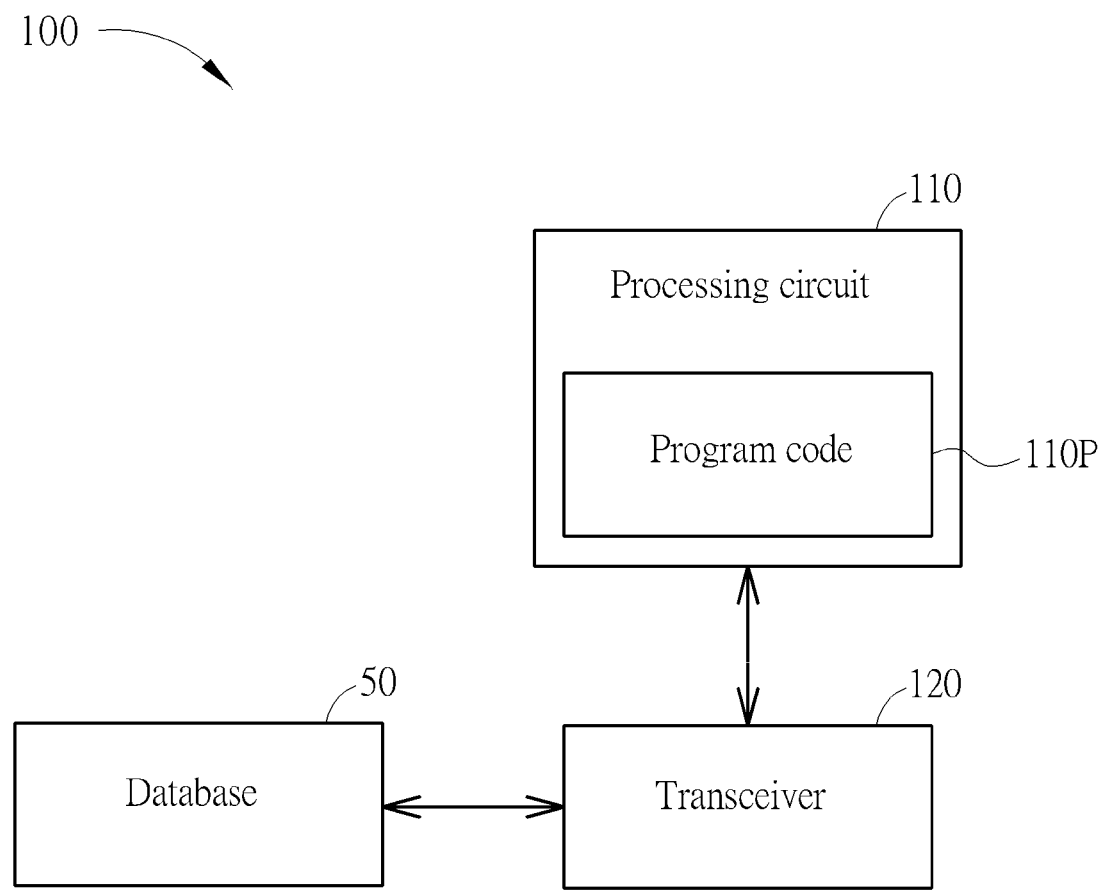
FIG. 1 is a diagram of an apparatus for showing hierarchical structure for a given power intent described in a power intent description language (more particularly, a formal power intent description language) with a design described in a hardware design description language according to a first embodiment of the present invention.

Please refer to FIG. 1, which illustrates a diagram of an apparatus 100 for showing hierarchical structure for a given power intent described in a power intent description language (more particularly, a formal power intent description language) with a design described in a hardware design description language according to a first embodiment of the present invention, where the apparatus 100 may comprise at least one portion (e.g. a portion or all) of an electronic device. For example, the apparatus 100 may comprise a portion of the electronic device mentioned above, and more particularly, can be at least one hardware circuit such as at least one integrated circuit (IC) within the electronic device. In another example, the apparatus 100 can be the whole of the electronic device mentioned above. In another example, the apparatus 100 may comprise a system comprising the electronic device mentioned above (e.g. an audio/video system comprising the electronic device). Examples of the electronic device may include, but not limited to, a mobile phone (e.g. a multifunctional mobile phone), a personal digital assistant (PDA), workstation, and a personal computer such as a laptop computer or a desktop computer. In practice, the electronic device may be equipped with at least one Central Processing Unit (CPU) (e.g. one or more CPUs), at least one monitor (e.g. one or more monitors), and/or at least one memory (e.g. one or more memories).

As shown in FIG. 1, the apparatus 100 may comprise a processing circuit 110 arrange to control operations of the electronic device, and may further comprise a transceiver 120 arranged to transmit or receive information for the electronic device, where the transceiver 120 is coupled to the processing circuit 110, and the transceiver 120 may further be coupled to a database 50, which is arranged to store some design files of one or more users (e.g. one or more designers of various kinds of electronic products). For example, the processing circuit 110 may comprise at least one processor and associated hardware resources, and the transceiver 120 may comprise a transmitter and a receiver such as those for wired or wireless network communications, where the processor may execute some program codes 110P (e.g. program instructions). More particularly, the apparatus 100 may further comprise a storage module 130 (e.g. a hard disk drive (HDD), or a non-volatile memory such as a Flash memory) arranged to store information for the electronic device, and the processing circuit 110 may be arrange to control the aforementioned operations of the electronic device according to the program codes 110P (e.g. program instructions) loaded (or retrieved) from the storage module 130.

In the embodiment shown in FIG. 1, the database 50 may be positioned outside the electronic device. This is for illustrative purposes only, and is not meant to be a limitation of the present invention. For example, the database 50 may be positioned within the electronic device. In some other examples, a portion of the database 50 may be positioned within the electronic device, while a portion of the database 50 may be positioned outside the electronic device.

In addition, in the embodiment shown in FIG. 1, the database 50 may be positioned within the apparatus 100. This is for illustrative purposes only, and is not meant to be a limitation of the present invention. According to some variations of this embodiment, the database 50 may be positioned outside the apparatus 100. According to some other variations of this embodiment, a portion of the database 50 may be positioned within the apparatus 100, while a portion of the database 50 may be positioned outside the apparatus 100.

According to this embodiment, the processing circuit 110 may retrieve one or more files of the design files mentioned above from the database 50, and show the hierarchical structure of the aforementioned one or more files for the aforementioned one or more users (e.g. one or more designers of various kinds of electronic products) by using a display module, which may be positioned within or outside the electronic device, to provide the aforementioned one or more users (e.g. one or more designers of various kinds of electronic products) with sufficient information that is typically helpful on power designs.

Figure 2:
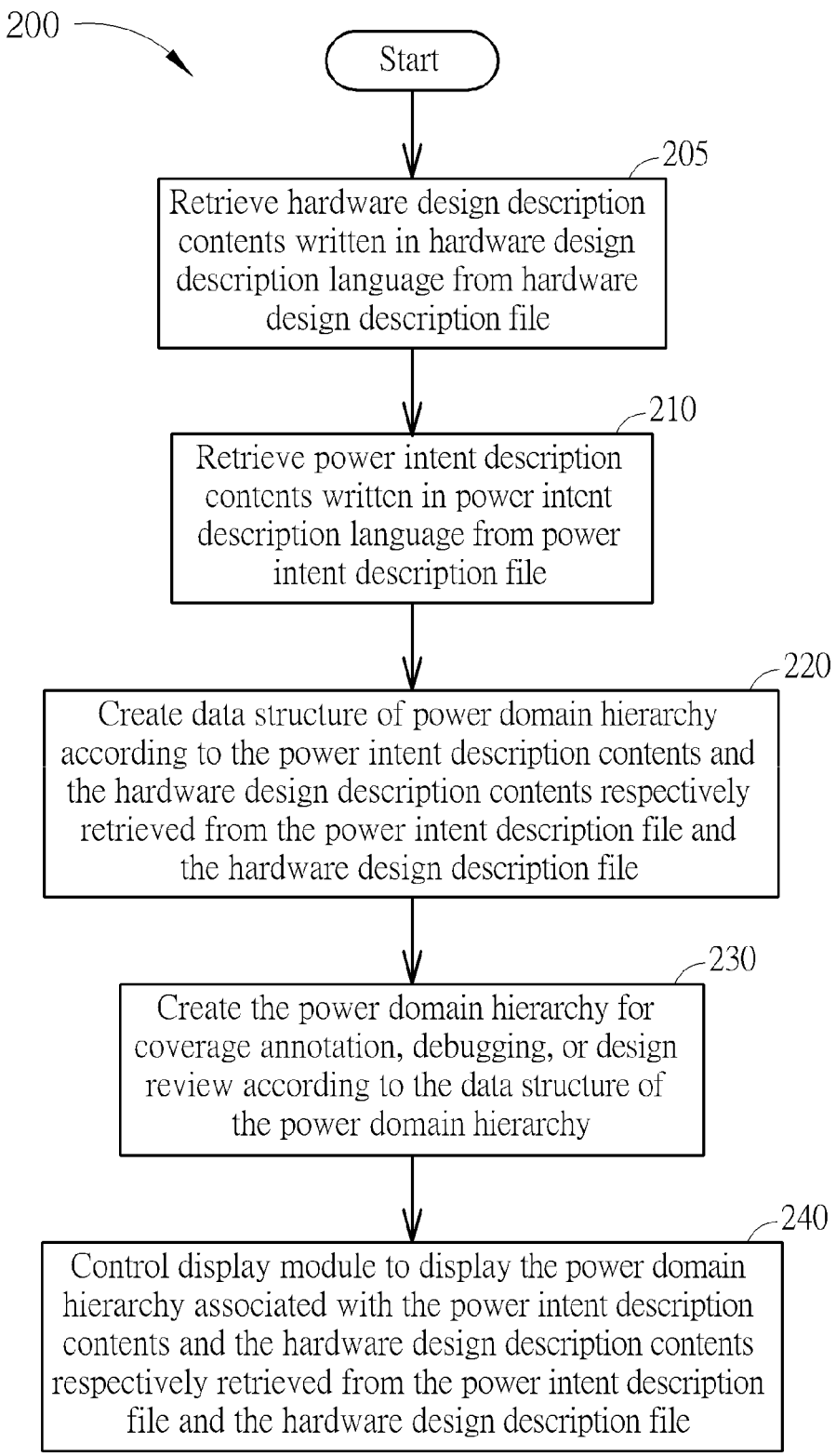
FIG. 2 illustrates a flowchart of a method for showing hierarchical structure for a given power intent described in a power intent description language (more particularly, a formal power intent description language) with a design described in a hardware design description language according to an embodiment of the present invention.

FIG. 2 illustrates a flowchart of a method 200 for showing hierarchical structure for a given power intent described in a power intent description language such as that mentioned above (more particularly, a formal power intent description language such as that mentioned above) with a design described in a hardware design description language such as that mentioned above according to an embodiment of the present invention. The method 200 shown in FIG. 2 can be applied to the apparatus 100 shown in FIG. 1, and can be applied to the processing circuit 110 thereof (more particularly, the processing circuit 110 executing the program codes 110P of the embodiment shown in FIG. 1). For example, the program code 110P may be provided through a computer program product having program instructions (such as those mentioned above) for instructing a processor such as that mentioned above to perform the method 200 shown in FIG. 2, where the computer program product may be implemented as a non-transitory computer-readable medium (e.g. a floppy disk or a compact disc-read only memory (CD-ROM)) storing the program instructions or an equivalent version thereof, such as a software package for being installed. This is for illustrative purposes only, and is not meant to be a limitation of the present invention. The method can be described as follows.

In Step 205, the processing circuit 110 retrieves hardware design description contents written in the hardware design description language from a hardware design description file, where the hardware design description file can be taken as an example of the aforementioned one or more files of the design files in the database 50 mentioned above. For example, the hardware design description language can be Very-High-Speed Integrated Circuits (VHSIC) Hardware Description Language, which can be referred to as VHDL (IEEE standard 1076). This is for illustrative purposes only, and is not meant to be a limitation of the present invention. In another example, the hardware design description language can be SystemVerilog (IEEE standard 1800). In another example, the hardware design description language can be Verilog (IEEE standard 1364).

In Step 210, the processing circuit 110 retrieves power intent description contents written in the power intent description language (more particularly, the formal power intent description language) from a power intent description file, where the power intent description file can be taken as an example of the aforementioned one or more files of the design files in the database 50 mentioned above. For example, the power intent description language can be the unified power format (UPF) language (or the so-called IEEE standard 1801). This is for illustrative purposes only, and is not meant to be a limitation of the present invention.

In Step 220, the processing circuit 110 creates a data structure of a power domain hierarchy according to the power intent description contents and the hardware design description contents respectively retrieved from the power intent description file and the hardware design description file, where the power domain hierarchy is typically associated with the power intent description contents and the hardware design description contents respectively retrieved from the power intent description file and the hardware design description file. For example, based on the hardware design description contents retrieved from the hardware design description file, the processing circuit 110 may determine a plurality of design instances in the data structure of the power domain hierarchy.

In Step 230, the processing circuit 110 creates the power domain hierarchy for coverage annotation, debugging, or design review according to the data structure of the power domain hierarchy. For example, the processing circuit 110 may create the power domain hierarchy to be a tree structure, in order to provide the aforementioned one or more users (e.g. one or more designers of various kinds of electronic products) with sufficient information that is typically helpful on power designs. This is for illustrative purposes only, and is not meant to be a limitation of the present invention.

In Step 240, the processing circuit 110 controls a display module such as that mentioned above to display the aforementioned power domain hierarchy associated with the power intent description contents and the hardware design description contents respectively retrieved from the power intent description file and the hardware design description file, where the power domain hierarchy may comprises at least one power domain (e.g. one or more power domains).

According to this embodiment, the processing circuit 110 analyzes the power intent description contents (more particularly, the power intent description contents and the hardware design description contents) to determine one or more power domain relationships between a plurality of power domains in the data structure of the power domain hierarchy. For example, based on the power intent description contents retrieved from the power intent description file (more particularly, the power intent description contents and the hardware design description contents respectively retrieved from the power intent description file and the hardware design description file), the processing circuit 110 may determine a first power domain of the plurality of power domains to be above a second power domain of the plurality of power domains in the data structure of the power domain hierarchy. This is for illustrative purposes only, and is not meant to be a limitation of the present invention. In another example, based on the power intent description contents retrieved from the power intent description file (more particularly, the power intent description contents and the hardware design description contents respectively retrieved from the power intent description file and the hardware design description file), the processing circuit 110 may determine a power domain of the plurality of power domains to be above any other power domain of the plurality of power domains in the data structure of the power domain hierarchy.

In some examples, based on the power intent description contents retrieved from the power intent description file (more particularly, the power intent description contents and the hardware design description contents respectively retrieved from the power intent description file and the hardware design description file), the processing circuit 110 may divide an initial temporary power domain of the data structure of the power domain hierarchy into a first temporary power domain and a second temporary power domain to generate the plurality of power domains in the data structure of the power domain hierarchy. More particularly, based on the power intent description contents retrieved from the power intent description file (more particularly, the power intent description contents and the hardware design description contents respectively retrieved from the power intent description file and the hardware design description file), the processing circuit 110 may determine at least one portion (e.g. a portion or all) of the first temporary power domain to be a first power domain of the plurality of power domains in the data structure of the power domain hierarchy, and determine at least one portion (e.g. a portion or all) of the second temporary power domain to be a second power domain of the plurality of power domains in the data structure of the power domain hierarchy. For example, in a situation where the aforementioned at least one portion of the first temporary power domain does not comprise all of the first power domain, based on the power intent description contents retrieved from the power intent description file (more particularly, the power intent description contents and the hardware design description contents respectively retrieved from the power intent description file and the hardware design description file), the processing circuit 110 may divide the first temporary power domain into the first power domain and another power domain of the plurality of power domains. This is for illustrative purposes only, and is not meant to be a limitation of the present invention. In some examples, there may be at least two power domain nodes that are finally created in the hierarchical tree, and each power domain node of the aforementioned at least two power domain nodes may contain only a certain portion of the first temporary power domain.

In another example, in a situation where the aforementioned at least one portion of the first temporary power domain does not comprise all of the first power domain, based on the power intent description contents retrieved from the power intent description file (more particularly, the power intent description contents and the hardware design description contents respectively retrieved from the power intent description file and the hardware design description file), the processing circuit 110 may divide the first temporary power domain into the first power domain and another temporary power domain, and dividing the other temporary power domain one or more times to generate other power domains of the plurality of power domains. This is for illustrative purposes only, and is not meant to be a limitation of the present invention. In some examples, there may be more than three power domain nodes that are finally created in the hierarchical tree.

In another example, in a situation where the aforementioned at least one portion of the first temporary power domain does not comprise all of the first power domain, based on the power intent description contents retrieved from the power intent description file (more particularly, the power intent description contents and the hardware design description contents respectively retrieved from the power intent description file and the hardware design description file), the processing circuit 110 may determine the first power domain of the plurality of power domains to be above the second power domain of the plurality of power domains in the data structure of the power domain hierarchy. In another example, in a situation where the aforementioned at least one portion of the second temporary power domain does not comprise all of the second power domain, based on the power intent description contents retrieved from the power intent description file (more particularly, the power intent description contents and the hardware design description contents respectively retrieved from the power intent description file and the hardware design description file), the processing circuit 110 may determine the first power domain of the plurality of power domains to be above the second power domain of the plurality of power domains in the data structure of the power domain hierarchy.

In some examples, the data structure of the power domain hierarchy may comprises a plurality of design instances such as that mentioned above, and based on the power intent description contents retrieved from the power intent description file (more particularly, the power intent description contents and the hardware design description contents respectively retrieved from the power intent description file and the hardware design description file), the processing circuit 110 may determine a mapping relationship between a scope of a specific design instance of the plurality of design instances and a base domain of the specific design instance, and may selectively update the mapping relationship when needed, and may further determine the aforementioned one or more power domain relationships between the plurality of power domains in the data structure of the power domain hierarchy with the aid of the mapping relationship. For example, any design instance of the plurality of design instances may fall within a power domain of the plurality of power domains in the data structure of the power domain hierarchy. More particularly, the plurality of design instances is below the hierarchy of the top power design, and any design instance of the plurality of design instances below the hierarchy of the top power design falls within a power domain of the plurality of power domains in the data structure of the power domain hierarchy. In another example, based on the power intent description contents retrieved from the power intent description file (more particularly, the power intent description contents and the hardware design description contents respectively retrieved from the power intent description file and the hardware design description file), the processing circuit 110 may determine a plurality of mapping relationships between scopes of the plurality of design instances and base domains of the plurality of design instances, respectively, and may selectively update the mapping relationships when needed, and may further determine a design instance set corresponding to the same scope to be within the same power domain of the plurality of power domains, where the design instance set may comprise one or more design instances within the plurality of design instances. Thus, the processing circuit 110 is capable of utilizing one or more scopes as one or more keys to perform one or more table look up operations, in order to obtain one or more table look up results such as one or more node corresponding to the aforementioned one or more scopes.

In some examples, the data structure of the power domain hierarchy may comprises a plurality of design instances such as that mentioned above, and based on the power intent description contents retrieved from the power intent description file (more particularly, the power intent description contents and the hardware design description contents respectively retrieved from the power intent description file and the hardware design description file), the processing circuit 110 may determine a mapping relationship between a scope of a specific design instance of the plurality of design instances and a base domain of the specific design instance, store the mapping relationship in a look up table (LUT), and selectively update the mapping relationship stored in the LUT when needed.

Figure 3:
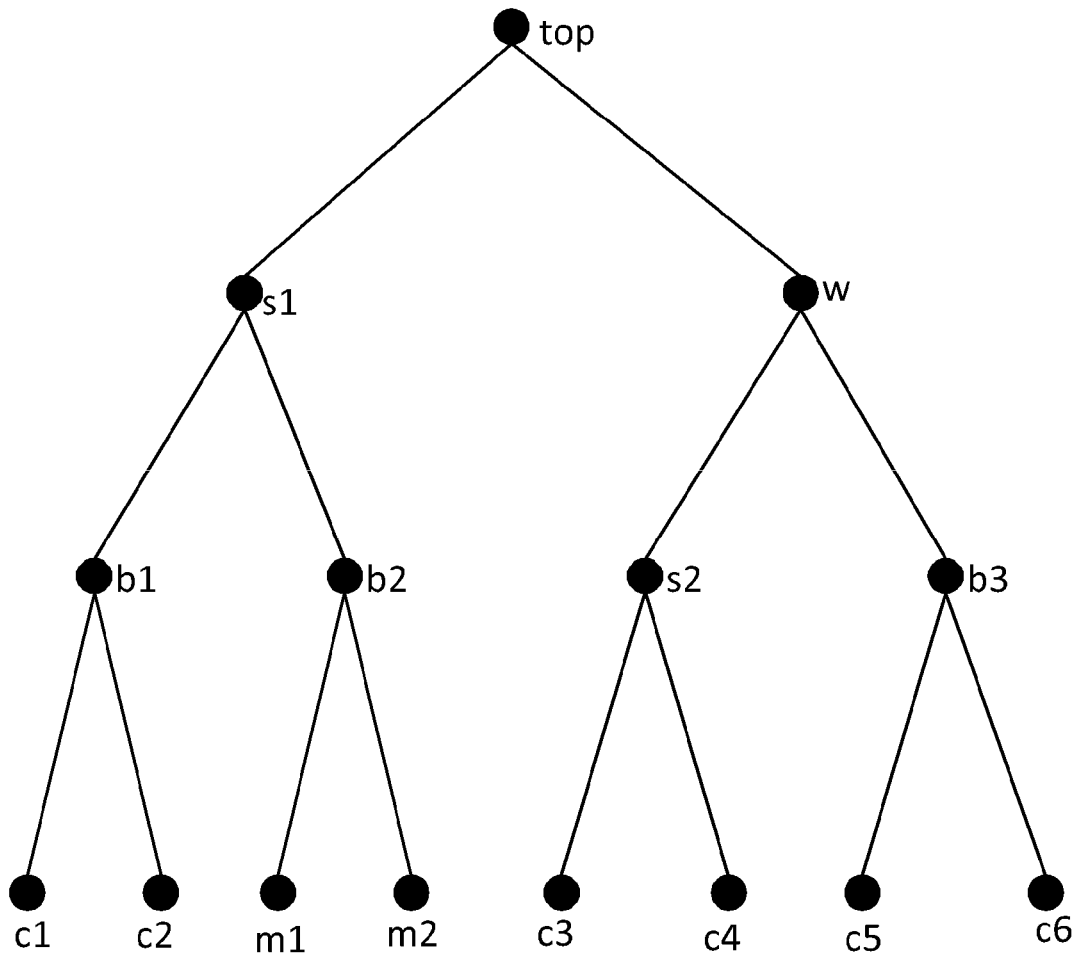
FIG. 3 illustrates the first phase of a control scheme involved with the method shown in FIG. 2 according to an embodiment of the present invention.

FIG. 3 illustrates the first phase of a control scheme involved with the method 200 shown in FIG. 2 according to an embodiment of the present invention. The circles shown in FIG. 3 can be regarded as design instances, which can be taken as an example of the plurality of design instances mentioned above, where the notations respectively labeled at the circles shown in FIG. 3, such as the notations "top", "s1", "w", "b1", "b2", "s2", "b3", "c1", "c2", "m1", "m2", "c3", "c4", "c5", and "c6", can be taken as examples of the names of these design instances. In the first phase of the control scheme, the processing circuit 110 retrieves the hardware design description contents written in the hardware design description language from the hardware design description file. In addition, based on the hardware design description contents retrieved from the hardware design description file, the processing circuit 110 determines the plurality of design instances in the data structure, such as the design instances labeled "top", "s1", "w", "b1", "b2", "s2", "b3", "c1", "c2", "m1", "m2", "c3", "c4", "c5", and "c6" in FIG. 3.

According to this embodiment, in some of the following phases of the control scheme, such as any of the second phase through to the seventh phase, the processing circuit 110 retrieves the power intent description contents written in the power intent description language from the power intent description file, and creates the data structure of the power domain hierarchy according to the power intent description contents retrieved from the power intent description file, step by step.

Figure 4:
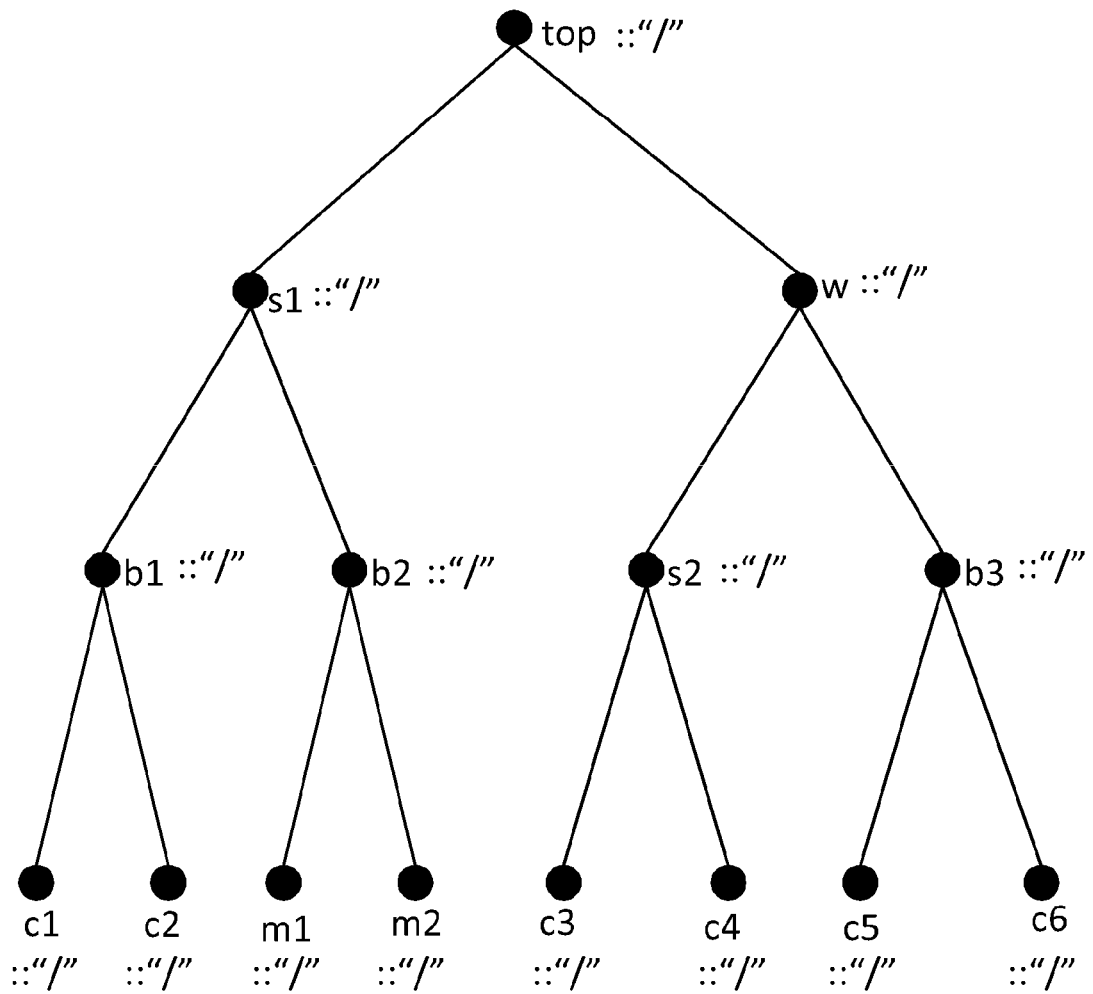
FIG. 4 illustrates the second phase of the control scheme according to the embodiment shown in FIG. 3.

FIG. 4 illustrates the second phase of the control scheme according to the embodiment shown in FIG. 3. For example, in a situation where the power intent description language is the UPF language, the power intent description contents retrieved from the power intent description file may comprise at least one command line typically carrying at least one command and further carrying at least one parameter, such as:
set_design_top top
where the command set_design_top in the above command line can be utilized for setting the top of the power design described in the power intent description file to be the design instance labeled "top" in FIG. 4.

According to this embodiment, the processing circuit 110 analyzes the power intent description contents and detects the above command line, and therefore determines the scope of each of the design instances shown in FIG. 4 to be the same as that of the design instance labeled "top" in FIG. 4, such as the root (labeled "/" in FIG. 4, for example) of these design instances, where some of the scopes of the design instances shown in FIG. 4 may be updated later in response to the subsequent command lines in the power intent description contents retrieved from the power intent description file, except for the scope of the design instance labeled "top" in FIG. 4. For example, in response to the command line "set_design_top top", the processing circuit 110 may record the scope of each of the plurality of design instances with a corresponding scope recording string, such as that next to the first double colon notation "::" coming after the name of each of the design instances shown in FIG. 4. This is for illustrative purposes only, and is not meant to be a limitation of the present invention.

Figure 5:
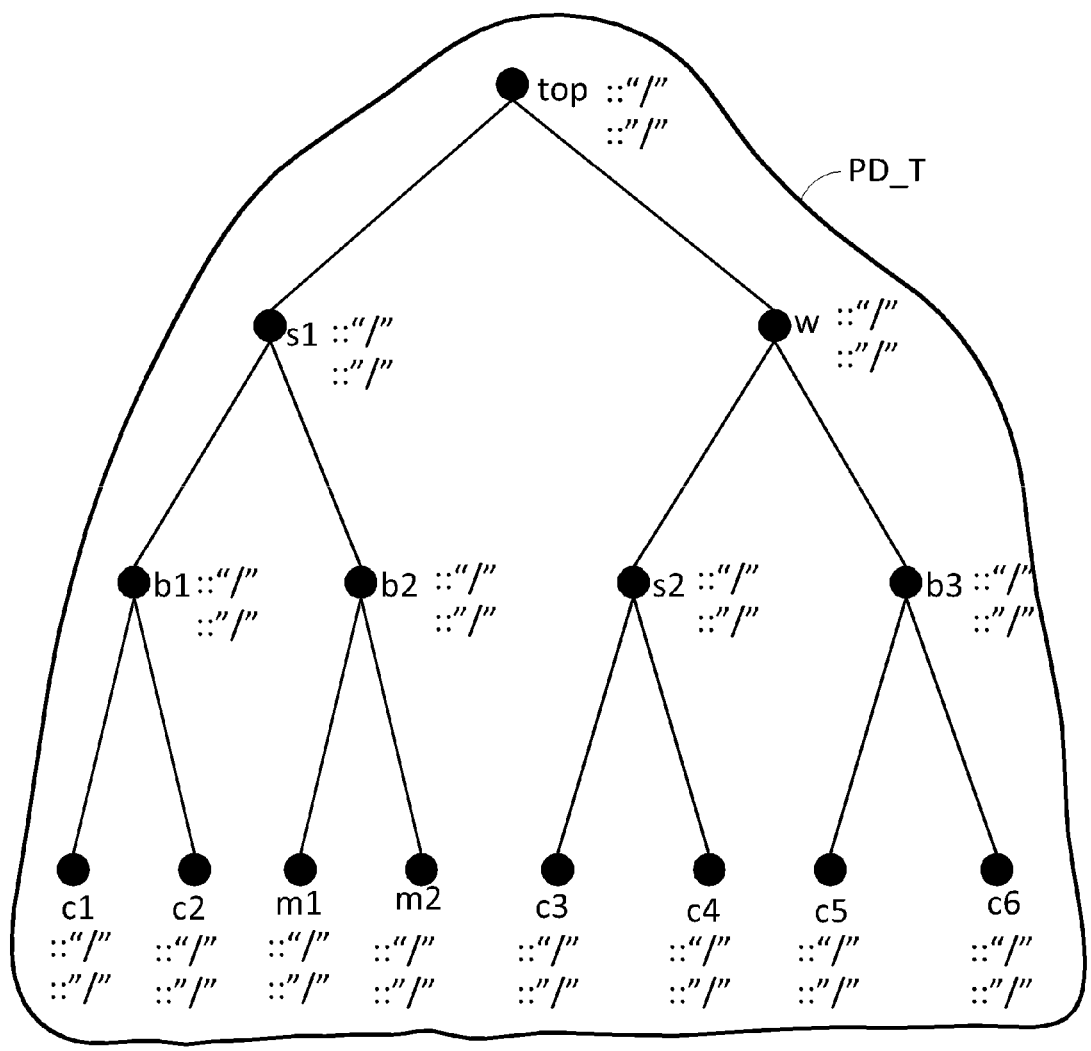
FIG. 5 illustrates the third phase of the control scheme according to the embodiment shown in FIG. 3.

FIG. 5 illustrates the third phase of the control scheme according to the embodiment shown in FIG. 3. For example, in a situation where the power intent description language is the UPF language, the power intent description contents retrieved from the power intent description file may further comprise at least one command line typically carrying at least one command and further carrying at least one parameter, such as:
create_power_domain PD_T
where the command create_power_domain in the above command line can be utilized for creating a new base power domain PD_T in the power design described in the power intent description file. The power domain PD_T can be taken as an example of the aforementioned initial temporary power domain of the data structure of the power domain hierarchy mentioned in Step 220.

According to this embodiment, the processing circuit 110 analyzes the power intent description contents and detects the above command line, and therefore determines the parent node of each of the design instances shown in FIG. 5 to be the same as that of the design instance labeled "top" in FIG. 5, such as the root (labeled "/" in FIG. 5, for example) of these design instances in this phase (i.e. the third phase), where some of the parent nodes of the design instances shown in FIG. 5 may be updated later in response to the subsequent command lines in the power intent description contents retrieved from the power intent description file, except for the parent node of the design instance labeled "top" in FIG. 5. For example, in response to the command line "create_power_ domain PD_T", since a node in power domain hierarchical tree will be created, the processing circuit 110 may record the parent node of each of the plurality of design instances with a corresponding parent node recording string, such as that next to the second double colon notation "::" coming after the name of each of the design instances shown in FIG. 5. This is for illustrative purposes only, and is not meant to be a limitation of the present invention.

Please note that, based on the analyzing operations of this control scheme, the processing circuit 110 typically records the parent node of a design instance (e.g. the specific design instance mentioned above) as an upstream design instance of an upper power domain in the tree structure, except that the power domain comprising this design instance is the uppermost power domain in the tree structure. In a situation where the upper power domain comprises two or more design instances, the processing circuit 110 determines the uppermost design instance defined as the parent scope of the aforementioned two or more design instances in this upper power domain to be the upstream design instance mentioned above, and therefore records the parent node of this design instance (e.g. the specific design instance mentioned above) as scope of the aforementioned two or more design instances. In addition, in a situation where the power domain comprising this design instance (e.g. the specific design instance mentioned above) is the uppermost power domain in the tree structure, based on the analyzing operations of this control scheme, the processing circuit 110 typically records the parent node of this design instance as the uppermost design instance in the power domain comprising this design instance. This is for illustrative purposes only, and is not meant to be a limitation of the present invention.

In practice, the processing circuit 110 may store a mapping relationship between the scope of any design instance of the plurality of design instances and a corresponding base domain of the this design instance (e.g. the aforementioned mapping relationship between the scope of the specific design instance of the plurality of design instances and the base domain of the specific design instance) in a hash table, where the hash table can be taken as an example of the LUT mentioned above. More particularly, based on the LUT such as the hash table, the processing circuit 110 may utilize the scope of this design instance as a key to determine a corresponding node such as the corresponding base domain of this design instance, through table look up. For example, in a situation where the key is "/", the corresponding node is the power domain PD_T.

Figure 6:
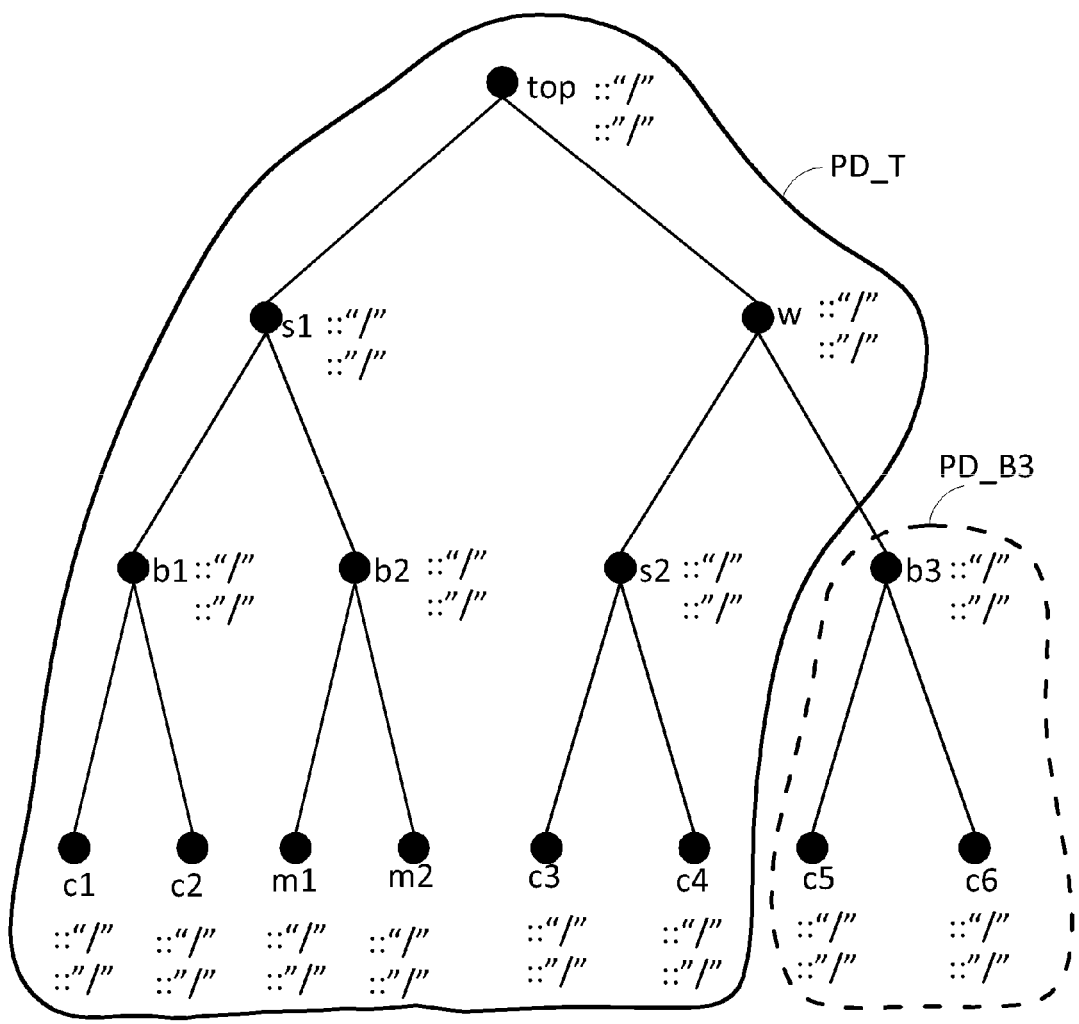
FIG. 6 illustrates the fourth phase of the control scheme according to the embodiment shown in FIG. 3.

FIG. 6 illustrates the fourth phase of the control scheme according to the embodiment shown in FIG. 3. For example, in a situation where the power intent description language is the UPF language, the power intent description contents retrieved from the power intent description file may further comprise at least one command line typically carrying at least one command and further carrying at least one parameter, such as:

---
create_power_domain PD_B3 \
-elements w/b3
--- where the command create_power_domain in the above command lines can be utilized for creating a power domain PD_B3 comprising elements such as the downstream design instances starting from the design instance b3 in the power design described in the power intent description file, and the notation "w/b3" denotes the location of the instance b3 in the design tree structure. The power domain PD_B3 can be taken as an example of one of the first temporary power domain and the second temporary power domain that are divided from the aforementioned initial temporary power domain of the data structure of the power domain hierarchy mentioned in Step 220.

According to this embodiment, the processing circuit 110 analyzes the power intent description contents and detects the above command lines, and therefore determines that the parent node of each of the design instances shown in FIG. 6 should be unchanged in this phase (i.e. the fourth phase), where some of the parent nodes of the design instances shown in FIG. 6 may be updated later in response to the subsequent command lines in the power intent description contents retrieved from the power intent description file, except for the parent node of the design instance labeled "top" in FIG. 6. For example, in response to the command lines "create_power_domain PD_B3\-elements w/b3", the processing circuit 110 omits recording the parent node of each of the plurality of design instances with the corresponding parent node recording string, such as that next to the second double colon notation "::" coming after the name of each of the design instances shown in FIG. 6. This is for illustrative purposes only, and is not meant to be a limitation of the present invention. Please note that, in some examples, the scope is unchanged and the created power domain PD_B3 is not a new base domain. In some examples, in response to the command lines "create_power_domain PD_B3 \-elements w/b3", the processing circuit 110 will not change the recorded parent node of each of the plurality of design instances, such as that next to the second double colon notation "::" coming after the name of each of the design instances shown in FIG. 6, which means the corresponding parent node recording string is substantially unchanged, since there is no new node created by this UPF command.

Figure 7:
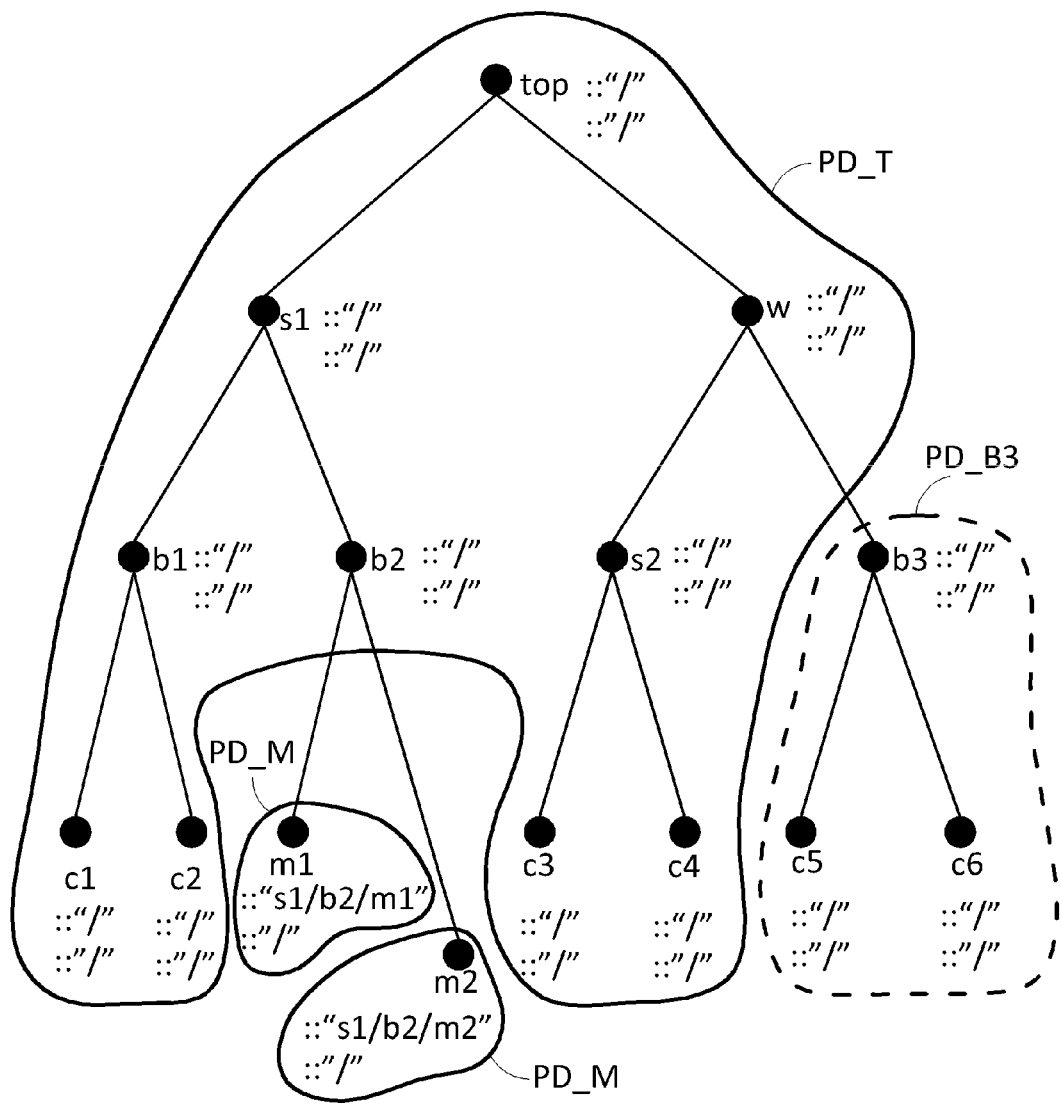
FIG. 7 illustrates the fifth phase of the control scheme according to the embodiment shown in FIG. 3.

FIG. 7 illustrates the fifth phase of the control scheme according to the embodiment shown in FIG. 3. For example, in a situation where the power intent description language is the UPF language, the power intent description contents retrieved from the power intent description file may further comprise at least one command line typically carrying at least one command and further carrying at least one parameter, such as:

---
| set_scope | s1/b2/m1 |
| load_upf | "macro.upf" |
| set_scope | / |
| load_upf | "macro.upf" \ |
| -scope | s1/b2/m2 |
--- where the command set_scope in the above command lines can be utilized for changing the current scope of the power design, and the command load_upf in the above command lines can be utilized for loading a macro UPF file "macro.upf" for a macro. For better comprehension, an example of the macro UPF file "macro.upf" is listed as follows:

---
macro.upf
create_power_domain PD_M
other UPF command (not contain create_power_domain)
--- where the command create_power_domain in the macro UPF file "macro.upf" can be utilized for creating two new base power domains {PD_M} with corresponding scopes "s1/b2/m1" and "s1/b2/m2" set by the commands "set_scope s1/b2/m1" and 'load_upf "macro.upf"-scope s1/b2/m2', respectively. As a result, the processing circuit 110 creates two nodes {PD_M} shown around the bottommost of FIG. 7 after processing the four UPF commands demonstrated above. For example, the processing circuit 110 records (or updates) the scope of the power domain PD_M corresponding to the design instance labeled "m1" to be "s1/b2/m1" in the scope recording string next to the first double colon notation "::" coming after the name "m1" of this design instance. In another example, the processing circuit 110 records (or updates) the scope of the power domain PD_M corresponding to the design instance labeled "m2" to be "s1/b2/m2" in the scope recording string next to the first double colon notation "::" coming after the name "m2" of this design instance.

More particularly, after creating the two power domains {PD_M} below the power domain PD_T, the processing circuit 110 updates the aforementioned LUT such as the hash table mentioned above, where the processing circuit 110 may utilize the latest scope of a design instance as a key to determine a corresponding node such as the corresponding base domain of this design instance, through table look up. For example, in a situation where the key is "s1/b2/m1", the corresponding node is the power domain PD_M(1), i.e. the power domain PD_M that is created when the macro UPF file "macro.upf" is first loaded in the above command lines. In another example, in a situation where the key is "s1/b2/m2", the corresponding node is the power domain PD_M(2), i.e. the power domain PD_M that is created when the macro "macro.upf" is later loaded in the above command lines.

Figure 8:
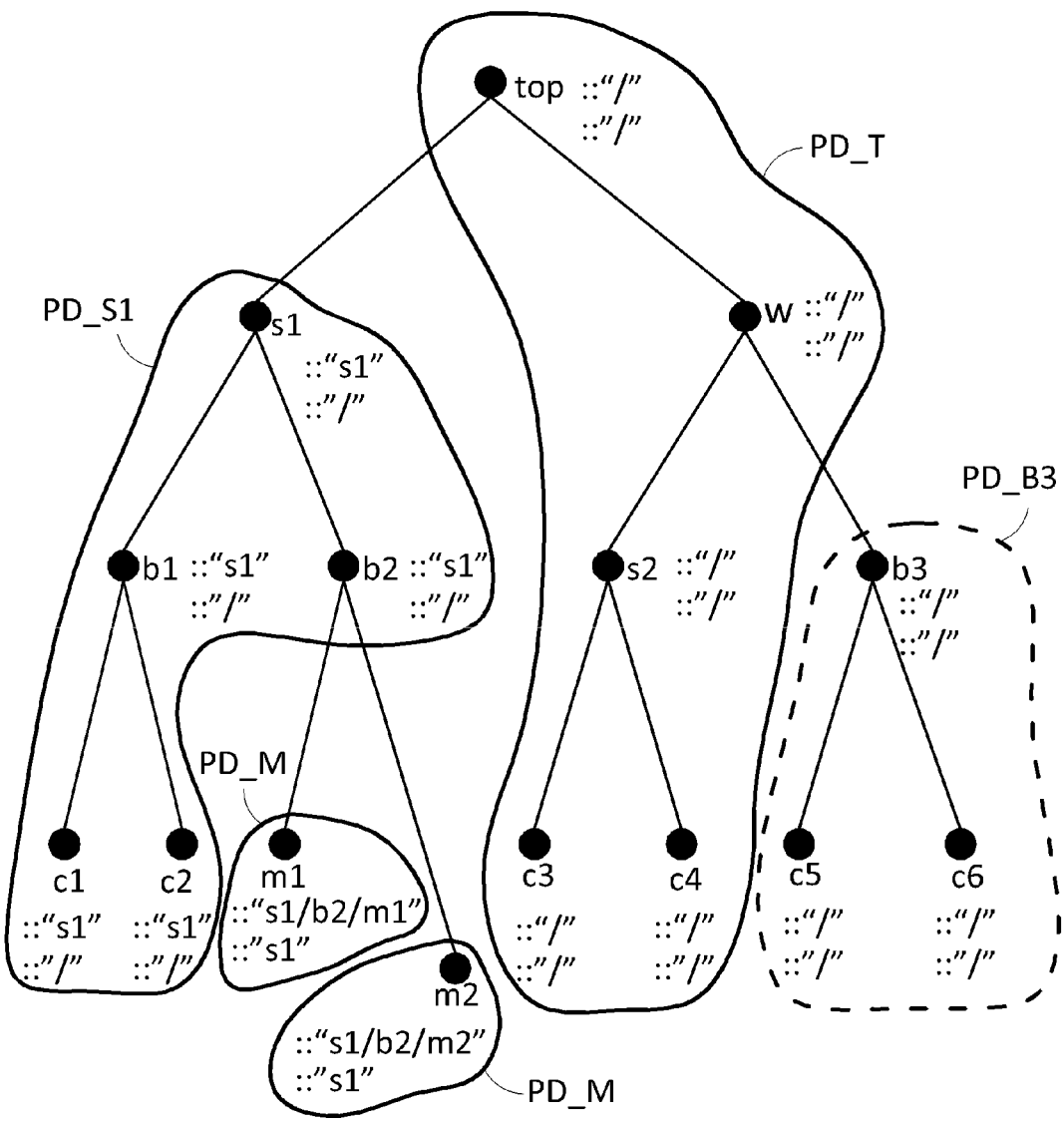
FIG. 8 illustrates the sixth phase of the control scheme according to the embodiment shown in FIG. 3.

FIG. 8 illustrates the sixth phase of the control scheme according to the embodiment shown in FIG. 3. For example, in a situation where the power intent description language is the UPF language, the power intent description contents retrieved from the power intent description file may further comprise at least one command line typically carrying at least one command and further carrying at least one parameter, such as:

load_upf "sub1.upf"-scope s1 where the command load_upf in the above command line can be utilized for loading an IP UPF file such as the UPF file "sub1.upf". For better comprehension, an example of the UPF file "sub1.upf" is listed as follows:

```
#sub1.upf
create_power_domain PD_S1
#other UPF command (not contain create_power_domain)
``` where the command create_power_domain in the UPF file "sub1.upf" can be utilized for creating a new base power domain PD_S1 with the corresponding scope "s1" set by the command 'load_upf "sub1.upf"-scope s1'. As a result, the processing circuit 110 has created a new power node as shown in FIG. 8. For example, the processing circuit 110 records (or updates) the scope of the power domain PD_S1 corresponding to each of the design instances labeled "s1", "b1", "b2", "c1", and "c2" to be "s1" in the corresponding scope recording string next to the first double colon notation "::" coming after the name (e.g. "s1", "b1", "b2", "c1", or "c2") of each of these design instance.

According to this embodiment, the processing circuit 110 analyzes the power intent description contents and detects the above command line, and therefore determines that the parent node of some of the design instances shown in FIG. 8 should be changed in this phase (i.e. the sixth phase). More particularly, after creating the power domain PD_S1 above the two power domains {PD_M} that are previously created, the processing circuit 110 updates the parent node of each of the downstream instances in the two power domains {PD_M} below the power domain PD_S1. Those three power domains are also referred as nodes in the power domain hierarchical tree. For example, the processing circuit 110 records (or updates) the parent node of the power domain PD_M corresponding to the design instance labeled "m1" to be "s1" in the parent node recording string next to the second double colon notation "::" coming after the name "m1" of this design instance. In another example, the processing circuit 110 records (or updates) the parent node of the power domain PD_M corresponding to the design instance labeled "m2" to be "s1" in the parent node recording string next to the second double colon notation "::" coming after the name "m2" of this design instance.

More particularly, after creating the power domain PD_S1 above the two power domains {PD_M} that are previously created, the processing circuit 110 updates the aforementioned LUT such as the hash table mentioned above, where the processing circuit 110 may utilize the latest scope of a design instance as a key to determine a corresponding node such as the corresponding base domain of this design instance, through table look up. For example, in a situation where the key is "s1", the corresponding node is the power domain PD_S1, i.e. the power domain PD_S1 that is created when the UPF file "sub1.upf" is loaded in the above command line.

Figure 9:
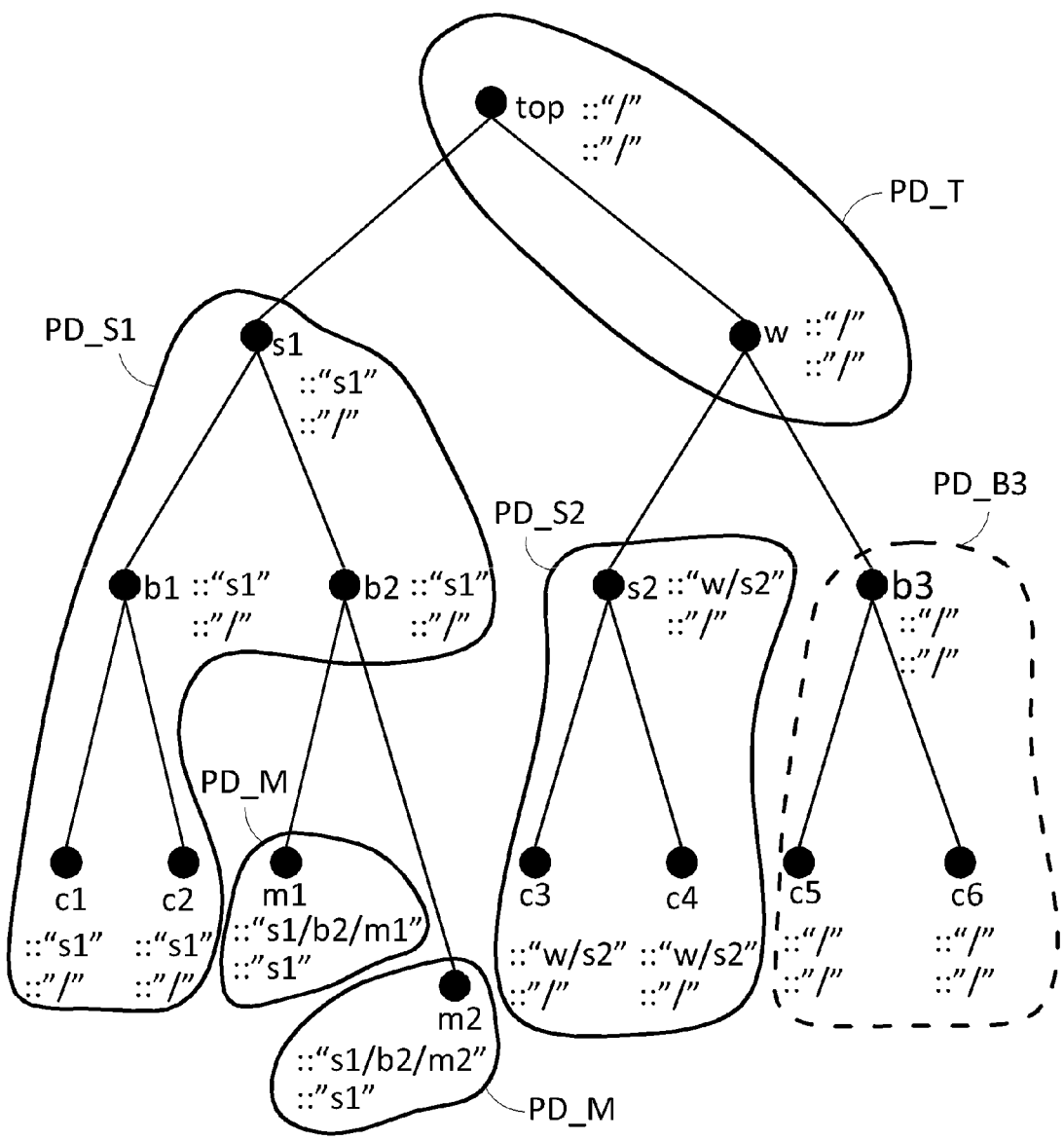
FIG. 9 illustrates the seventh phase of the control scheme according to the embodiment shown in FIG. 3.

FIG. 9 illustrates the seventh phase of the control scheme according to the embodiment shown in FIG. 3. For example, in a situation where the power intent description language is the UPF language, the power intent description contents retrieved from the power intent description file may further comprise at least one command line typically carrying at least one command and further carrying at least one parameter, such as:

```
set_scope w/s2
source "sub2.upf"
set_scope /
create_pst T_PST
``` where the command set_scope in the above command lines can be utilized for changing the current scope of the power design, and the command "source" in the above command lines can be utilized for loading an IP UPF file such as the UPF file "sub2.upf" to define the power intent for an IP. For better comprehension, an example of the macro "sub2.upf" is listed as follows:

```
#sub2.upf
create_power_domain PD_S2
#other UPF command (not contain create_power_domain)
``` where the command create_power_domain in the UPF file "sub2.upf" can be utilized for creating a new base power domain PD_S2 with the corresponding scope "w/s2" set by the command "set_scope w/s2". As a result, the processing circuit 110 has created a new node as shown in FIG. 9. For example, the processing circuit 110 records (or updates) the scope of the power domain PD_S2 corresponding to each of the design instances labeled "s2", "c3", and "c4" to be "w/s2" in the corresponding scope recording string next to the first double colon notation "::" coming after the name (e.g. "s2", "c3", or "c4") of each of these design instances.

According to this embodiment, the processing circuit 110 analyzes the power intent description contents and detects the above command lines, and therefore determines that the parent node of each of the design instances shown in FIG. 9 should be unchanged in this phase (i.e. the seventh phase). For example, in response to the above command lines that trigger the operation of creating the power domain PD_S2, the processing circuit 110 omits recording the parent node of each of the plurality of design instances with the corresponding parent node recording string, such as that next to the second double colon notation "::" coming after the name of each of the design instances shown in FIG. 9, since the parent node is unchanged after processing this command. This is for illustrative purposes only, and is not meant to be a limitation of the present invention. In another example, in response to the above command lines that trigger the operation of creating the power domain PD_S2, the processing circuit 110 may record the parent node of each of the plurality of design instances with the corresponding parent node recording string, such as that next to the second double colon notation "::" coming after the name of each of the design instances shown in FIG. 9, with the original string, which means the corresponding parent node recording string is substantially unchanged.

More particularly, after creating the power domain PD_S2 below the power domain PD_T, the processing circuit 110 updates the aforementioned LUT such as the hash table mentioned above, where the processing circuit 110 may utilize the latest scope of a design instance as a key to determine a corresponding node such as the corresponding base domain of this design instance, through table look up. For example, in a situation where the key is "w/s2", the corresponding node is the power domain PD_S2, i.e. the power domain PD_S2 that is created when the UPF file "sub2.upf" is loaded in the above command lines.

Figure 10:
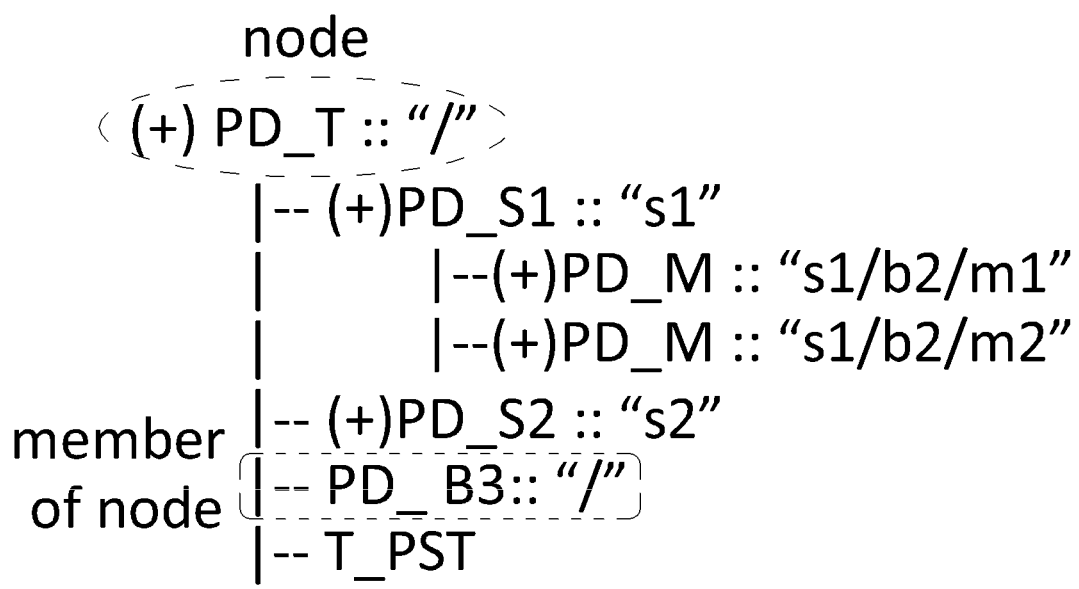
FIG. 10 illustrates the eighth phase of the control scheme according to the embodiment shown in FIG. 3.

FIG. 10 illustrates the eighth phase of the control scheme according to the embodiment shown in FIG. 3. As shown in FIG. 10, the processing circuit 110 controls the display module mentioned in Step 240 to display the power domain hierarchy created in Step 230 (i.e. the aforementioned power domain hierarchy associated with the power intent description contents and the hardware design description contents respectively retrieved from the power intent description file and the hardware design description file), such as the power domain hierarchy created in at least one portion (e.g. a portion or all) of the above described phases of the control scheme (e.g. the first phase through to the seventh phase of this control scheme).

In addition, the power domain hierarchy of this embodiment may comprise multiple power domain nodes in the tree architecture, such as the uppermost power domain node PD_T, the power domain nodes PD_S1, PD_S2, and PD_B3 that are below the uppermost power domain node PD_T, and the two power domain nodes {PD_M} that are below the power domain node PD_S1. This is for illustrative purposes only, and is not meant to be a limitation of the present invention. According to a variation of this embodiment, the two power domain nodes {PD_M} having the same domain name can be grouped for simplicity.

Figure 11:
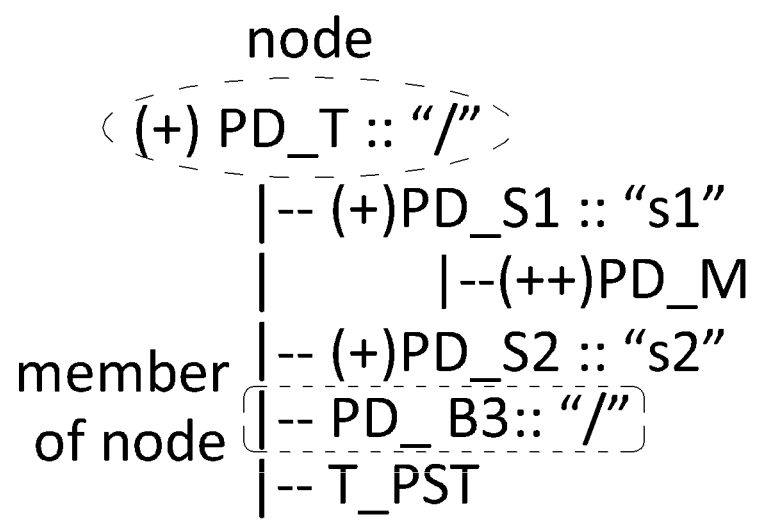
FIG. 11 illustrates the eighth phase of the control scheme according to another embodiment of the present invention.

FIG. 11 illustrates the eighth phase of the control scheme according to another embodiment of the present invention, such as a variation of the embodiment shown in FIG. 3. As shown in FIG. 11, the processing circuit 110 controls the display module mentioned in Step 240 to display the power domain hierarchy created in Step 230 (i.e. the aforementioned power domain hierarchy associated with the power intent description contents and the hardware design description contents respectively retrieved from the power intent description file and the hardware design description file), such as the power domain hierarchy created in at least one portion (e.g. a portion or all) of the above described phases of the control scheme (e.g. the first phase through to the seventh phase of this control scheme).

In addition, the power domain hierarchy of this embodiment may comprise multiple power domain nodes in the tree architecture, such as the uppermost power domain node PD_T, the power domain nodes PD_S1, PD_S2, and PD_B3 that are below the uppermost power domain node PD_T, and a power domain node group (labeled "PD_M" in FIG. 11, with the notation "++") which represents the aforementioned two power domain nodes {PD_M} that are below the power domain node PD_S1. Please note that the two power domain nodes {PD_M} having the same domain name are grouped into this power domain node group (labeled "PD_M" in FIG. 11). More particularly, the notation "++" indicates that the entity labeled "PD_M" in the power domain hierarchy displayed in Step 240 is a set of power domain nodes, and there are multiple power domain nodes (i.e. the aforementioned two power domain nodes {PD_M} in this variation) having the same domain name in this set of power domain nodes, such as the power domain node group mentioned above. Similar descriptions are not repeated in detail for this variation.

According to some embodiments of the present invention, such as some variations of the embodiment shown in FIG. 2 (e.g. some variations of the embodiment shown in FIG. 3), a plurality of criterions for creating the power domain hierarchy may be applied to the apparatus 100 shown in FIG. 1, and can be applied to the processing circuit 110 thereof (more particularly, the processing circuit 110 executing the program codes 110P of the embodiment shown in FIG. 1). For example, the power domain hierarchy should follow the hardware design hierarchy. In another example, a node can be created only when the operation of changing the scope and the operation of creating the base domain are performed. In another example, the processing circuit 110 should record the parent scope of every node. In another example, in a situation where a command line such as that listed below is detected:
create_power_domain PD_X-elements { ... }
the processing circuit 110 may determine the power domain PD_X to be a member of the current node, where the notation { ... } represents a set of design elements. More particularly, the processing circuit 110 can use the current scope as a key to find out the related node (e.g. the corresponding node mentioned above). In a situation where the processing circuit 110 cannot find any node for the current scope, then the processing circuit 110 may use the parent scope to find the related node for the current scope. For example, the same rule can be applied to a power state table (PST) such as the PST T_PST, which comes after the command create_pst in the above command lines of the seventh phase of the control scheme shown in FIG. 3, where the command create_pst can be utilized for creating a PST such as the PST T_PST. This is for illustrative purposes only, and is not meant to be a limitation of the present invention. According to some variations of these embodiments, the plurality of criterions for creating the power domain hierarchy may be varied. For example, a portion of the plurality of criterions may be removed. In another example, a portion of the plurality of criterions may be selectively omitted when needed. In another example, a portion of the plurality of criterions may be replaced by one or more other criterions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A method for showing hierarchical structure for a given power intent described in a power intent description language with a design described in a hardware design description language, the method comprising the steps of:
retrieving, by utilizing a processing circuit of an electronic device, hardware design description contents written in the hardware design description language from a hardware design description file, and retrieving, by utilizing the processing circuit, power intent description contents written in the power intent description language from a power intent description file;
creating, by utilizing the processing circuit, a data structure of a power domain hierarchy according to the power intent description contents and the hardware design description contents respectively retrieved from the power intent description file and the hardware design description file;
creating, by utilizing the processing circuit, the power domain hierarchy for coverage annotation, debugging, or design review according to the data structure of the power domain hierarchy; and
controlling, by utilizing the processing circuit, a display module to display the power domain hierarchy associated with the power intent description contents and the hardware design description contents respectively retrieved from the power intent description file and the hardware design description file, wherein the power domain hierarchy comprises at least one power domain.

2. The method of claim 1, wherein the power intent description language is the unified power format (UPF) language.

3. The method of claim 1, wherein the step of creating the data structure of the power domain hierarchy according to the power intent description contents and the hardware design description contents respectively retrieved from the power intent description file and the hardware design description file further comprises:
   analyzing the power intent description contents to determine one or more power domain relationships between a plurality of power domains in the data structure of the power domain hierarchy.

4. The method of claim 3, wherein the step of analyzing the power intent description contents to determine the one or more power domain relationships between the plurality of power domains in the data structure of the power domain hierarchy further comprises:
   based on the power intent description contents retrieved from the power intent description file, determining a first power domain of the plurality of power domains to be above a second power domain of the plurality of power domains in the data structure of the power domain hierarchy.

5. The method of claim 3, wherein the step of analyzing the power intent description contents to determine the one or more power domain relationships between the plurality of power domains in the data structure of the power domain hierarchy further comprises:
   based on the power intent description contents retrieved from the power intent description file, determining a power domain of the plurality of power domains to be above any other power domain of the plurality of power domains in the data structure of the power domain hierarchy.

6. The method of claim 3, wherein the step of analyzing the power intent description contents to determine the one or more power domain relationships between the plurality of power domains in the data structure of the power domain hierarchy further comprises:
   based on the power intent description contents retrieved from the power intent description file, dividing an initial temporary power domain of the data structure of the power domain hierarchy into a first temporary power domain and a second temporary power domain to generate the plurality of power domains in the data structure of the power domain hierarchy.

7. The method of claim 6, wherein the step of analyzing the power intent description contents to determine the one or more power domain relationships between the plurality of power domains in the data structure of the power domain hierarchy further comprises:
   based on the power intent description contents retrieved from the power intent description file, determining at least one portion of the first temporary power domain to be a first power domain of the plurality of power domains in the data structure of the power domain hierarchy, and determining at least one portion of the second temporary power domain to be a second power domain of the plurality of power domains in the data structure of the power domain hierarchy.

8. The method of claim 7, wherein the at least one portion of the first temporary power domain does not comprise all of the first power domain; and the step of analyzing the power intent description contents to determine the one or more power domain relationships between the plurality of power domains in the data structure of the power domain hierarchy further comprises:
   based on the power intent description contents retrieved from the power intent description file, dividing the first temporary power domain into the first power domain and another power domain of the plurality of power domains.

9. The method of claim 7, wherein the at least one portion of the first temporary power domain does not comprise all of the first power domain; and the step of analyzing the power intent description contents to determine the one or more power domain relationships between the plurality of power domains in the data structure of the power domain hierarchy further comprises:
   based on the power intent description contents retrieved from the power intent description file, dividing the first temporary power domain into the first power domain and another temporary power domain, and dividing the other temporary power domain one or more times to generate other power domains of the plurality of power domains.

10. The method of claim 7, wherein the at least one portion of the first temporary power domain does not comprise all of the first power domain; and the step of analyzing the power intent description contents to determine the one or more power domain relationships between the plurality of power domains in the data structure of the power domain hierarchy further comprises:
    based on the power intent description contents retrieved from the power intent description file, determining the first power domain of the plurality of power domains to be above the second power domain of the plurality of power domains in the data structure of the power domain hierarchy.

11. The method of claim 7, wherein the at least one portion of the second temporary power domain does not comprise all of the second power domain; and the step of analyzing the power intent description contents to determine the one or more power domain relationships between the plurality of power domains in the data structure of the power domain hierarchy further comprises:
    based on the power intent description contents retrieved from the power intent description file, determining the first power domain of the plurality of power domains to be above the second power domain of the plurality of power domains in the data structure of the power domain hierarchy.

12. The method of claim 3, wherein the data structure of the power domain hierarchy comprises a plurality of design instances; and the step of analyzing the power intent description contents to determine the one or more power domain relationships between the plurality of power domains in the data structure of the power domain hierarchy further comprises:
    based on the power intent description contents retrieved from the power intent description file, determining a mapping relationship between a scope of a specific design instance of the plurality of design instances and a base domain of the specific design instance, and selectively updating the mapping relationship when needed; and
    determining the one or more power domain relationships between the plurality of power domains in the data structure of the power domain hierarchy with aid of the mapping relationship.

13. The method of claim 12, wherein any design instance of the plurality of design instances falls within a power domain of the plurality of power domains in the data structure of the power domain hierarchy.

14. The method of claim 13, wherein the plurality of design instances is below a hierarchy of a top power design.

15. The method of claim 12, wherein the step of analyzing the power intent description contents to determine the one or more power domain relationships between the plurality of power domains in the data structure of the power domain hierarchy further comprises:

based on the power intent description contents retrieved from the power intent description file, determining a plurality of mapping relationships between scopes of the plurality of design instances and base domains of the plurality of design instances, respectively, and selectively updating the mapping relationships when needed; and determining a design instance set corresponding to a same scope to be within a same power domain of the plurality of power domains, wherein the design instance set comprises one or more design instances within the plurality of design instances.

16. The method of claim 3, wherein the data structure of the power domain hierarchy comprises a plurality of design instances; and the step of analyzing the power intent description contents to determine the one or more power domain relationships between the plurality of power domains in the data structure of the power domain hierarchy further comprises:

based on the power intent description contents retrieved from the power intent description file, determining a mapping relationship between a scope of a specific design instance of the plurality of design instances and a base domain of the specific design instance, storing the mapping relationship in a look up table (LUT), and selectively updating the mapping relationship stored in the LUT when needed.

17. The method of claim 1, wherein the step of creating the data structure of the power domain hierarchy according to the power intent description contents and the hardware design description contents respectively retrieved from the power intent description file and the hardware design description file further comprises:

based on the hardware design description contents retrieved from the hardware design description file, determining a plurality of design instances in the data structure of the power domain hierarchy.

18. An apparatus for showing hierarchical structure for a given power intent described in a power intent description language with a design described in a hardware design description language, the apparatus comprising at least one portion of an electronic device, the apparatus comprising:

a storage module arranged to store information for the electronic device; and a processing circuit of the electronic device, coupled to the storage module, arranged to control operations of the electronic device according to program instructions loaded from the storage module, wherein the processing circuit retrieves hardware design description contents written in the hardware design description language from a hardware design description file, retrieves power intent description contents written in the power intent description language from a power intent description file, creates a data structure of a power domain hierarchy according to the power intent description contents and the hardware design description contents respectively retrieved from the power intent description file and the hardware design description file, creates the power domain hierarchy for coverage annotation, debugging, or design review according to the data structure of the power domain hierarchy, and controls a display module to display the power domain hierarchy associated with the power intent description contents and the hardware design description contents respectively retrieved from the power intent description file and the hardware design description file, wherein the power domain hierarchy comprises at least one power domain, and the display module is positioned within or outside the electronic device.

19. A computer program product, having program instructions for instructing a processor of an electronic device to perform a method comprising the steps of:

retrieving, by utilizing a processing circuit of the electronic device, hardware design description contents written in a hardware design description language from a hardware design description file, and retrieving, by utilizing the processing circuit, power intent description contents written in a power intent description language from a power intent description file, wherein the processing circuit comprises the processor;

creating, by utilizing the processing circuit, a data structure of a power domain hierarchy according to the power intent description contents and the hardware design description contents respectively retrieved from the power intent description file and the hardware design description file;

creating, by utilizing the processing circuit, the power domain hierarchy for coverage annotation, debugging, or design review according to the data structure of the power domain hierarchy; and controlling, by utilizing the processing circuit, a display module to display the power domain hierarchy associated with the power intent description contents and the hardware design description contents respectively retrieved from the power intent description file and the hardware design description file, wherein the power domain hierarchy comprises at least one power domain, and the display module is positioned within or outside the electronic device.

* * * * *